US009450645B2

(12) United States Patent
Washiro

(10) Patent No.: US 9,450,645 B2
(45) Date of Patent: Sep. 20, 2016

(54) COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 13/490,920

(22) Filed: Jun. 7, 2012

(65) Prior Publication Data

US 2012/0322373 A1    Dec. 20, 2012

(30) Foreign Application Priority Data

Jun. 20, 2011    (JP) .................................. 2011-136773

(51) Int. Cl.
*G06K 19/00*    (2006.01)
*H04B 5/00*    (2006.01)
*H01Q 1/22*    (2006.01)
*H01Q 9/42*    (2006.01)
*G06K 19/07*    (2006.01)
*G06K 19/077*    (2006.01)

(52) U.S. Cl.
CPC .......... *H04B 5/0031* (2013.01); *H01Q 1/2266* (2013.01); *H01Q 1/2275* (2013.01); *H01Q 9/42* (2013.01); *H04B 5/0056* (2013.01); *G06K 19/0723* (2013.01); *G06K 19/07749* (2013.01)

(58) Field of Classification Search
USPC ........... 455/41.1, 90.2, 558, 561, 73, 82, 83, 455/76, 77; 343/702, 873, 895, 752, 834, 343/725, 741, 846, 762, 853
See application file for complete search history.

(56) References Cited

U.S. PATENT DOCUMENTS

| 6,476,767 | B2 * | 11/2002 | Aoyama et al. ....... 343/700 MS |
| 7,076,216 | B2 * | 7/2006 | Hayashi .......................... 455/78 |
| 7,769,867 | B2 * | 8/2010 | Fukuda ....................... 348/231.9 |
| 2004/0127182 | A1 * | 7/2004 | Hayashi .................... H01P 1/15 455/193.1 |
| 2005/0146392 | A1 * | 7/2005 | Karlsson .................. H04B 1/48 333/103 |
| 2007/0195458 | A1 * | 8/2007 | Sawai ..................... G06K 13/08 360/133 |
| 2007/0200651 | A1 * | 8/2007 | Kawai et al. ................. 333/205 |
| 2008/0125036 | A1 * | 5/2008 | Konya ................. H04B 5/0081 455/41.1 |
| 2009/0153412 | A1 |  6/2009 | Chiang et al. |
| 2009/0264067 | A1 * | 10/2009 | Pahlavan ......... G06K 19/07749 455/41.1 |
| 2010/0225542 | A1 * | 9/2010 | Suzuki ................... H01Q 1/243 343/700 MS |
| 2010/0244991 | A1 |  9/2010 | Washiro |
| 2010/0248625 | A1 * | 9/2010 | Washiro ................. H01Q 1/007 455/41.1 |

(Continued)

FOREIGN PATENT DOCUMENTS

JP    2001-77878    3/2001
JP    2006-216011    8/2006

(Continued)

OTHER PUBLICATIONS

"Transfer Jet", www.transferjet.org/en/index.html, Jan. 26, 2012, 2 pages.

(Continued)

*Primary Examiner* — Ganiyu A Hanidu
(74) *Attorney, Agent, or Firm* — Chip Law Group

(57) ABSTRACT

Provided is a communication apparatus including a substrate, a high-frequency coupling device including a coupling electrode and a ground formed as a conductive pattern on the substrate, a communication circuit unit configured to process a high-frequency signal transmitted and received by the coupling electrode, and a resonant unit configured to increase an amount of electric current flowing into the coupling electrode. The high-frequency coupling device is configured such that a longitudinal length is shorter than a lateral length.

10 Claims, 13 Drawing Sheets

(56) References Cited

U.S. PATENT DOCUMENTS

| | | |
|---|---|---|
| 2010/0327997 A1 | 12/2010 | Washiro |
| 2011/0006864 A1* | 1/2011 | Kato .................. H01P 5/00 333/24 R |
| 2012/0322373 A1* | 12/2012 | Washiro .............. H01Q 1/2266 455/41.1 |

FOREIGN PATENT DOCUMENTS

| | | |
|---|---|---|
| JP | 4345891 | 7/2009 |
| JP | 2010-67060 | 3/2010 |

OTHER PUBLICATIONS

"Regulations for Enforcement of the Radio Law", Jan. 26, 2012, 2 pages.

"Eye-Fi", www.eyefi.co.jp_translation.pdf, Jan. 26, 2012, 8 pages.

Extended European Search Report issued Sep. 20, 2012 in Patent Application No. 12171749.0.

Transferjet Consortium: "TransferJet™ Overview Whitepaper", XP-55037998, Jan. 1, 2009, pp. 1-10.

* cited by examiner

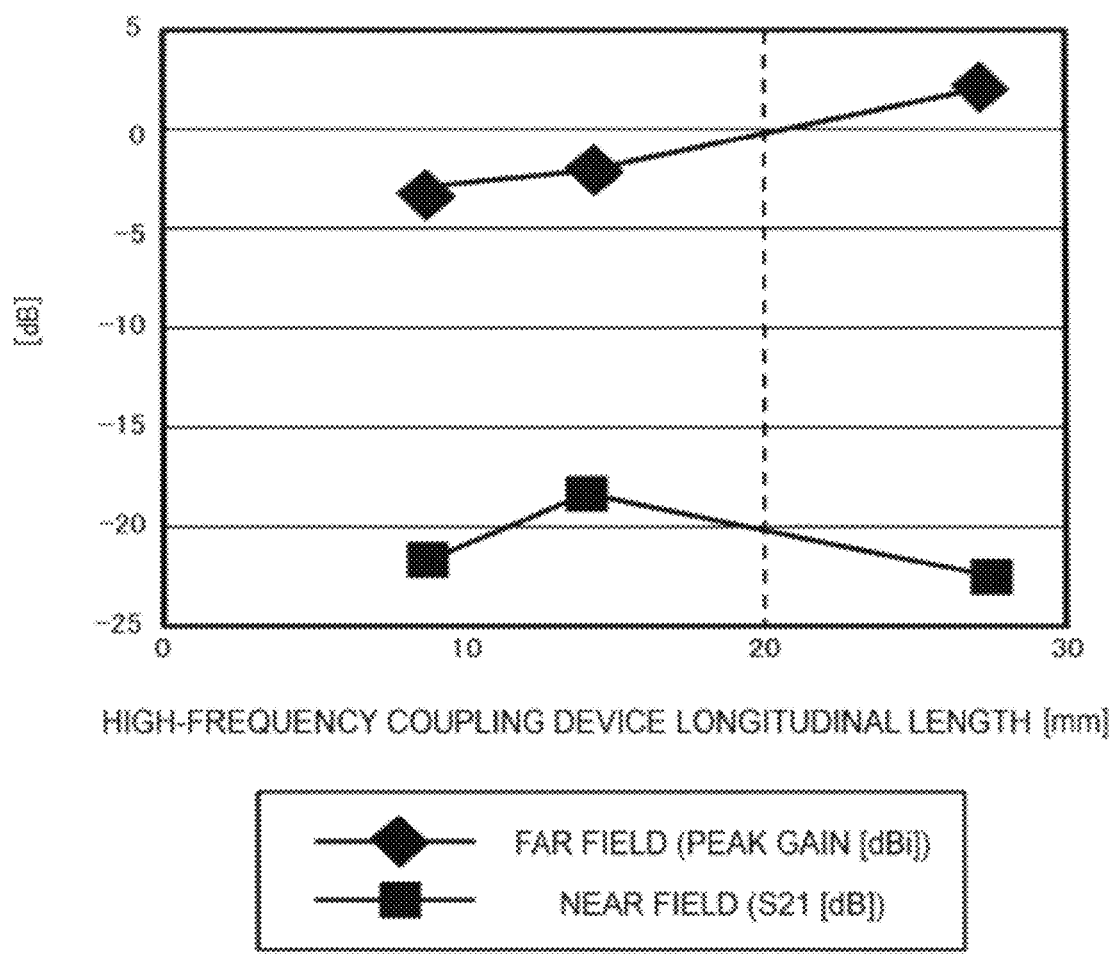

COMMUNICATION APPARATUS

BACKGROUND

The technique disclosed in the present specification relates to a communication apparatus for performing a noncontact communication, and more particularly, to a communication apparatus for performing communication by proximity wireless transfer using a weak UWB signal.

The noncontact communication is radio technology for transferring data in a transmission distance of zero to about several dozen centimeters, and has an advantage in that it is less affected by interference because there are less reflected waves from reflecting objects existing therearound and that it is not necessary to consider ensuring confidentiality and preventing hacking in a transmission path. Noncontact communication methods include a capacitive coupling method, an electromagnetic induction method, and a radio communication method.

Noncontact communication techniques that can be applied to high-speed communication include a proximity wireless transfer technique such as "TransferJet (registered trademark)" (for example, see www.transferjet.org/en/index.html (as of Jun. 14, 2011)). This proximity wireless transfer technique is basically a method for transmitting a signal using coupling action of induction field, and a communication apparatus thereof includes a communication circuit unit configured to process a high-frequency signal, a coupling electrode spaced apart and arranged at a certain height with respect to a ground, and a resonant unit efficiently providing the high-frequency signal to the coupling electrode. The coupling electrode or a component including the coupling electrode and the resonant unit will also be referred to as "high-frequency coupling device" or "coupler" in this specification.

One of the features of the proximity wireless transfer technique includes achievement of ultra high-speed data transmission at a speed of about 100 Mbps using a weak UWB (Ultra Wide Band) signal. Another feature of the proximity wireless transfer technique is the UWB communication, of which transmitting power is low. Therefore, an electric field strength (strength of radio wave) at a distance of three meters from radio equipment is equal to or less than a predetermined level. In other words, it is a weak radio which is almost at a noise level for another radio system existing nearby. For this reason, users can use this without obtaining any license (for example, see Radio Law Enforcement Regulations (Radio Regulatory Commission Rules No. 14, 1950), Section 6(1)(i)).

On the other hand, many information devices such as a personal computer (PC), a digital camera, a portable telephone, and a PDA (Personal Digital Assistant) have a slot into which a cartridge-type external memory such as a memory stick (registered trademark) and an SD (Secure Digital) card is inserted, thus achieving expansion of the storage capacity. Furthermore, memory cards having a radio communication function therein have been suggested (for example, see Japanese Patent Application Laid-Open No. 2001-77878 and Japanese Patent Application Laid-Open No. 2006-216011). Even if an information device such as a digital camera does not have a communication interface in itself, the information device can wirelessly transmit, in a direct and easy manner, large-capacity data such as still pictures and motion pictures recorded in an internal memory or a memory card when the memory card having a radio communication function is attached to a slot (for example, see www.eyefi.co.jp (as of Jun. 14, 2011)).

Alternatively, the proximity wireless transfer technique may be provided in a memory card (for example, see Japanese Patent Application Laid-Open No. 2010-67060). When the proximity wireless transfer technique is provided in a memory card, a high-frequency coupling device can be easily made by forming a ground and a coupling electrode as a wiring pattern on the same memory card substrate (for example, see Japanese Patent No. 4345891, FIG. 23).

In this case, when the memory card is inserted into the slot of the information device made of a metallic casing, there is a possibility that sufficient communication performance may not be achieved with the proximity wireless transfer technique using a low transmitting power. In particular, digital cameras are often made of metallic casing because the digital cameras has to have strength that can withstand drop even though the digital cameras are small and thin.

For this reason, when the proximity wireless transfer technique is provided in the memory card, it is preferable to improve the transmitting power, i.e., the coupling action of the induction field, at an end surface portion of the memory card, which is exposed to the outside when the memory card is inserted into the slot of the information device. However, as the induction electric field strength is increased, the strength of the radiation electromagnetic field increases, which is likely to affect another radio system existing nearby, and this makes it necessary to obtain a license to use the memory card. Moreover, this causes radiation of radiation electromagnetic field that is not used in the proximity wireless transfer, and the electric power is consumed. This weakens the induction electric field strength in a near field that is originally necessary for the proximity wireless transfer.

When the memory card is inserted into the inside of the metallic casing, the radiation electromagnetic field is shielded by the casing and is not radiated to the outside. Therefore, there may be a method for obtaining authentication under the Radio Law for the digital camera having the memory card inserted therein. For example, the design of the memory card having the proximity wireless transfer technique can be optimized and specialized for a particular type of digital camera. However, a vendor manufacturing and selling memory cards having the proximity wireless transfer technique is required to obtain authentication under the Radio Law for each type of digital camera instead of obtaining authentication under the Radio Law for the memory card itself, or the vendor is required to develop and manufacture memory cards for each type of digital camera, and this burden would be the problem. In other words, it is preferable for the memory card itself to satisfy the regulations under the Radio Law and ensure sufficient performance of the proximity wireless transfer even when the memory card is inserted into the metallic device casing.

SUMMARY

It is desirable to provide an excellent communication apparatus capable of communicating by proximity wireless transfer using a weak UWB signal.

It is also desirable to provide an excellent communication apparatus capable of communicating by the proximity wireless transfer using the weak UWB signal, wherein the communication apparatus is structured in a form of, for example, a memory card, and is used by being inserted into another information device such as a digital camera.

It is further desirable to provide an excellent communication apparatus inserted into another information device such as a digital camera and capable of communicating by the proximity wireless transfer using the weak UWB signal, wherein it is easy to obtain authentication under the Radio Law for the communication apparatus.

According to an embodiment of the present technique, there is provided a communication apparatus including a substrate, a high-frequency coupling device including a coupling electrode and a ground formed as a conductive pattern on the substrate, a communication circuit unit configured to process a high-frequency signal transmitted and received by the coupling electrode, and a resonant unit configured to increase an amount of electric current flowing into the coupling electrode. The high-frequency coupling device is configured such that a longitudinal length is shorter than a lateral length.

According to the embodiment of the present technique described above, an infinitesimal dipole made of a line segment connecting between a center of a charge accumulated in the coupling electrode and a center of an image charge accumulated in the ground is formed, and the high-frequency signal is transferred to a party in communication oppositely arranged such that an angle θ formed with a direction of the infinitesimal dipole is almost zero degrees.

According to the embodiment of the present technique described above, the longitudinal length of the high-frequency coupling device is sufficiently shorter than a half-wave of the high-frequency signal.

According to the embodiment of the present technique described above, the coupling electrode and the ground are formed on a same surface of the substrate.

According to the embodiment of the present technique described above, the substrate has a multi-layer structure. The coupling electrode and the ground are formed in different layers on the substrate.

According to the embodiment of the present technique described above, the communication apparatus further includes: a second ground on the substrate, wherein the second ground is separated from the ground of the high-frequency coupling device.

According to the embodiment of the present technique described above, the ground of the high-frequency coupling device and the second ground are formed on a same surface of the substrate and are separated by a slit.

According to the embodiment of the present technique described above, the second ground is used to ground a circuit component, other than the resonant unit, mounted on the substrate.

According to the embodiment of the present technique described above, the communication apparatus is incorporated into a memory card. The substrate is a memory card substrate on which a memory and a circuit component for the memory card are mounted.

According to the embodiment of the present technique described above, the communication apparatus is incorporated into an information device. The substrate is a main circuit substrate on which a main circuit component of the information device is mounted.

According to a technique disclosed in this specification, an excellent communication apparatus can be provided that can communicate by the proximity wireless transfer using the weak UWB signal, wherein the communication apparatus is structured in a form of, for example, a memory card, and is used by being inserted into another information device such as a digital camera.

According to a technique disclosed in this specification, an excellent communication apparatus can be provided, wherein the communication apparatus is structured in a form of, for example, a memory card, and the communication apparatus can preferably perform the proximity wireless transfer even when the communication apparatus is inserted into another information device such as a digital camera, by improving the transmitting power in an induction field nearby, and it is easy to obtain authentication under the Radio Law for the communication apparatus.

According to a technique disclosed in this specification, a high-frequency coupling device having high performance in a near field can be formed on a substrate. Therefore, even if the performance of the high-frequency coupling device for the near field is deteriorated when a memory card having the high-frequency coupling device and a communication module incorporated therein is inserted into a digital camera and the like made of a metallic casing, data of images taken by the digital camera can be transferred by the proximity wireless transfer at a high speed in a stable manner.

According to a technique disclosed in this specification, a high-frequency coupling device having a low radiant gain for a far field can be formed on a substrate. Therefore, even when the transmitting power is increased, the electric field strength leaked to the distance is small, and therefore, another communication system would not be affected. By increasing the transmitting power, the strength of the induction field for the near field where the proximity wireless transfer is originally performed is increased, and therefore, even when the device is inserted into a digital camera and the like made of a metallic casing, the device can communicate stably.

According to a technique disclosed in this specification, a high-frequency coupling device in which a longitudinal length is shorter than a lateral length is structured, so that the high-frequency coupling device does not transmit radio wave in the lateral direction. Therefore, it is possible to reduce the effect of interference caused by reflected waves from the metallic casing of the digital camera located in the lateral direction with respect to the memory card having the high-frequency coupling device and the communication module incorporated therein.

Other objects, features, and advantages of the technique disclosed in this specification will become apparent from detailed description based on attached drawings and embodiments explained below.

BRIEF DESCRIPTION OF THE DRAWINGS

FIG. 6A is a figure illustrating change a radiant gain in a far field and coupling strength in a near field when a longitudinal length of the high-frequency coupling device formed on the memory card substrate 12 is changed while a lateral length thereof is constant;

DETAILED DESCRIPTION OF THE EMBODIMENTS

Figure 1:
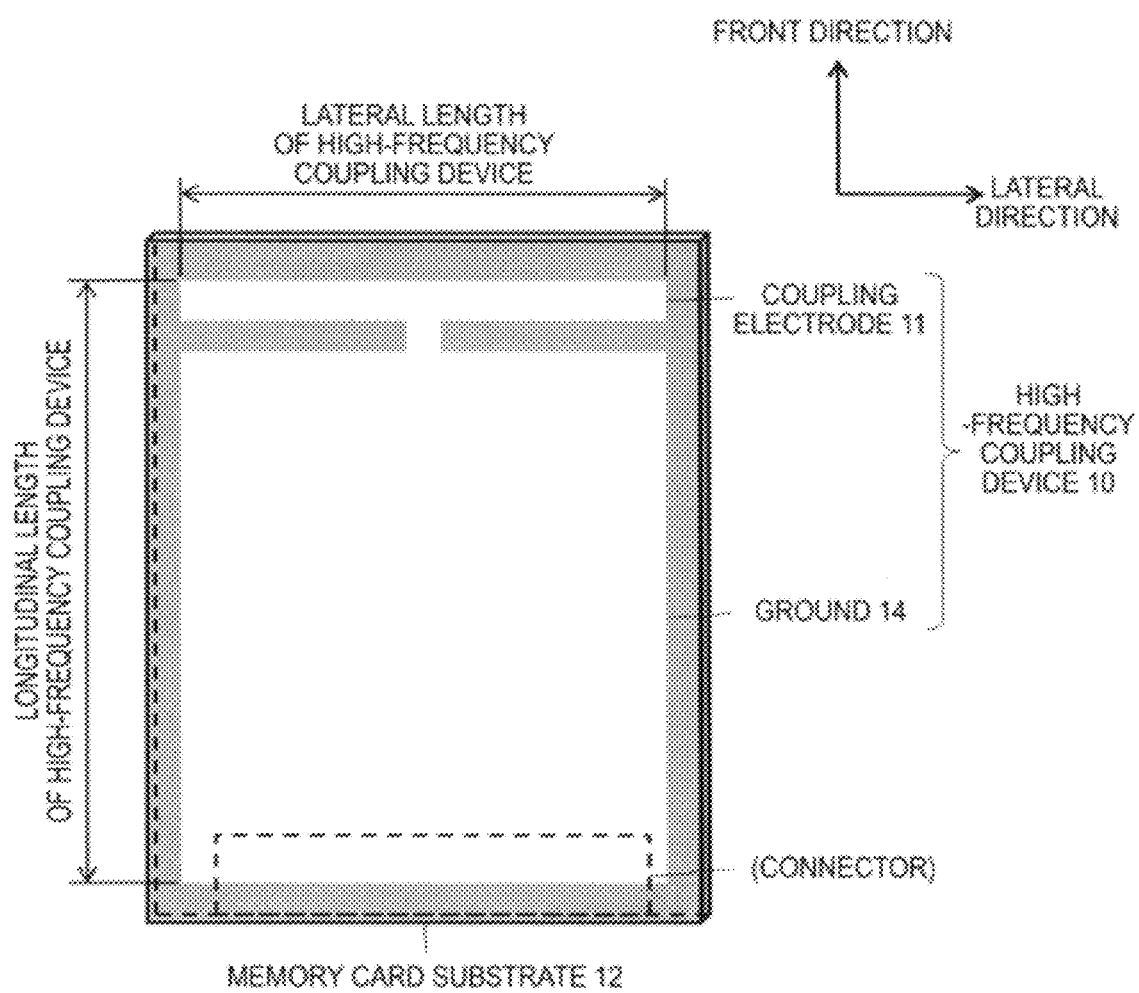
FIG. 1 is a figure illustrating an example of configuration of a high-frequency coupling device installed in a memory card, in which a ground and a coupling electrode are formed as a wiring pattern on the same memory card substrate.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Even when an information device such as a digital camera does not have a proximity wireless transfer function if itself, the information device can wirelessly transmit, in a direct and easy manner, large-capacity data such as taken still pictures and motion pictures when a memory card having the proximity wireless transfer technique is inserted into the information device. First, the principle of the proximity wireless transfer technique will be explained.

Figure 9:
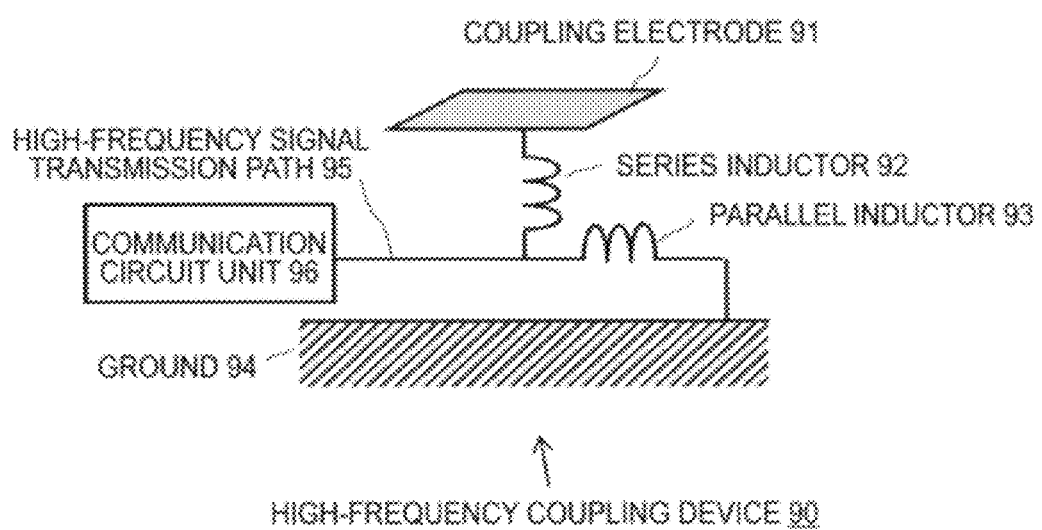
FIG. 9 is a figure schematically illustrating a basic configuration of a high-frequency coupling device used for proximity wireless transfer.

In the proximity wireless transfer, a high-frequency coupling device as shown in FIG. 9 is used as an antenna element. A high-frequency coupling device 90 has a planar coupling electrode 91 and a resonant unit including a series inductor 92 and a parallel inductor 93, and is connected to a communication circuit unit 96 via a high-frequency signal transmission path 95.

A high-frequency communication signal flows into the coupling electrode 91, where charge is accumulated. At this occasion, the current flowing to the coupling electrode 91 via the transmission path is amplified by the resonance effect of the resonant unit including the series inductor 92 and the parallel inductor 93, and a larger amount of charge is accumulated. When the charge Q is accumulated in the coupling electrode 91, the image charge −Q is accumulated in the ground 94.

Figure 10:
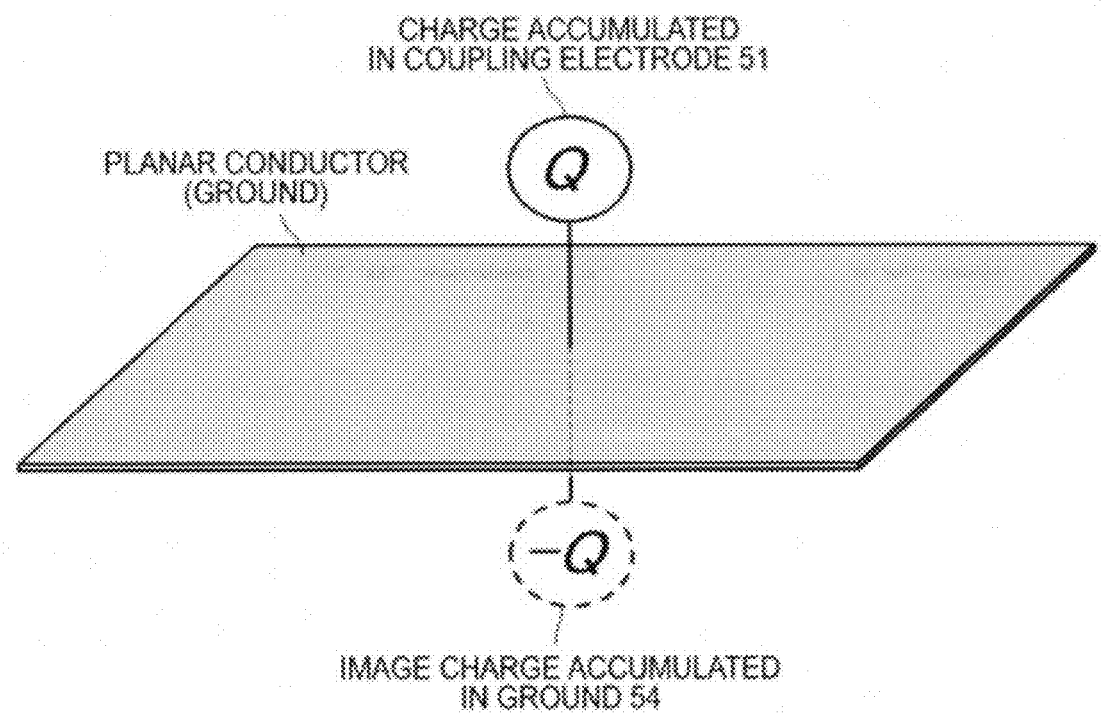
FIG. 10 is a figure illustrating how an image charge −Q is arranged within a planar conductor when a point charge Q is placed outside of the planar conductor.

In this case, when a point charge Q is placed outside of a planar conductor, an image charge −Q (virtually representing surface charge distribution) is arranged within the planar conductor, and this well-known in the field to which this specification pertains, as described in, e.g., Tadashi Mizoguchi, "Electromagnetism" (Shokabo, pages 54 to 57). FIG. 10 is a figure illustrating how the image charge −Q is arranged within the planar conductor when the point charge Q is placed outside of the planar conductor. In the figure, the planar conductor corresponds to the ground 94, and the point charge Q placed outside of the planar conductor corresponds to the accumulated charge of the coupling electrode 91. Theoretically, the planar conductor is infinitely large, but in reality, the planar conductor may be such that the distance from the point charge Q to the end of the surface of the conductor is sufficiently larger than the (shortest) distance from the point charge Q to the surface of the conductor even if the planar conductor is not an infinitely large plane.

As a result of accumulation of the point charge Q and the image charge −Q as described above, an infinitesimal dipole made of a line segment connecting between the center of the charge Q accumulated in the coupling electrode 91 and the center of the image charge −Q accumulated in the ground 94 is formed (strictly speaking, the charge Q and the image charge −Q have cubic volumes, and the infinitesimal dipole is formed to connect between the center of the charge Q and the center of the image charge −Q). The "infinitesimal dipole" referred to herein means "an electric dipole of which distance between charges is extremely short". For example, Yasuto Mushiake, "Antennas and Radio Propagation" (Corona Publishing Co., LTD., page 16 to 18) also describes an "infinitesimal dipole". The infinitesimal dipole generates a transverse wave component $E_\theta$ of the electric field, a longitudinal wave component $E_R$ of the electric field, and a magnetic field $H_\phi$ around the infinitesimal dipole.

Figure 11:
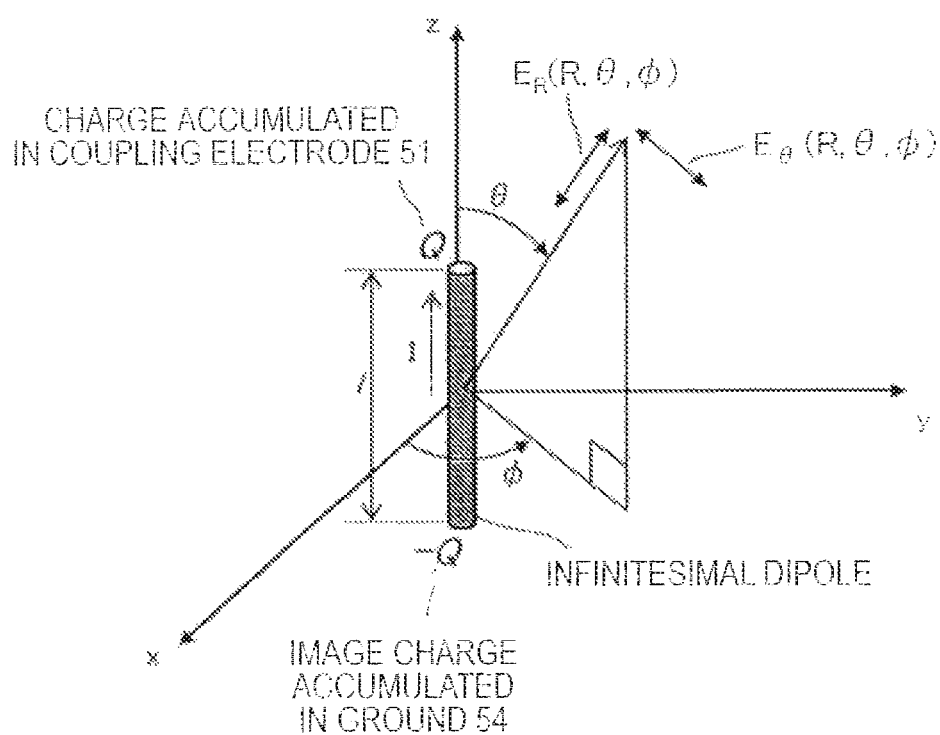
FIG. 11 is a figure representing an electric field caused by an infinitesimal dipole.

FIG. 11 illustrates an electric field generated by the infinitesimal dipole. As shown in the figure, the transverse wave component $E_\theta$ of the electric field oscillates in a direction perpendicular to a propagation direction, and the longitudinal wave component $E_R$ of the electric field oscillates in a direction parallel to the propagation direction. The magnetic field $H_\phi$ is generated around the infinitesimal dipole (not shown). The following expressions (1) to (3) represent electromagnetic fields generated by the infinitesimal dipole. In the expressions, a component in inversely proportional to a cube of the distance R is a static electromagnetic field, a component in inversely proportional to a square of the distance R is an induction electromagnetic field, and a component in inversely proportional to the distance R is a radiation electromagnetic field. The induction electromagnetic field corresponds to "near field", because it is greatly attenuated by the distance. In contrast, the radiation electromagnetic field corresponds to "far field", because it is less attenuated by the distance.

$$E_\theta = \frac{pe^{-jkR}}{4\pi\varepsilon}\left(\frac{1}{R^3} + \frac{jk}{R^2} - \frac{k^2}{R}\right)\sin\theta \quad (1)$$

$$E_R = \frac{pe^{-jkR}}{2\pi\varepsilon}\left(\frac{1}{R^3} + \frac{jk}{R^2}\right)\cos\theta \quad (2)$$

$$H_\phi = \frac{j\omega pe^{-jkR}}{4\pi}\left(\frac{1}{R^2} + \frac{jk}{R}\right)\sin\theta \quad (3)$$

However, in the above expressions (1) to (3), a moment p of the infinitesimal dipole and the distance R are defined by the following expressions (4), (5), respectively.

$$P = Ql$$

$$R = \sqrt{x^2 + y^2 + z^2}$$

In order to suppress interfering waves to ambient systems, it is preferable to use the longitudinal wave $E_R$ that does not include the radiation electromagnetic field while suppressing the transverse wave $E_\theta$ including the radiation electromagnetic field. This is because, as can be understood from the above expressions (1), (2), the transverse wave component $E_\theta$ of the electric field includes the radiation electromagnetic field corresponding to the far field, whereas the longitudinal wave component $E_R$ does not include the radiation electromagnetic field.

As can be seen from the above expression (2), the longitudinal wave $E_R$ component attains the maximum value when an angle θ formed with the direction of the infinitesimal dipole is zero degrees. Therefore, in order to perform the proximity wireless transfer while efficiently using the longitudinal wave $E_R$ of the electric field, it is preferable to transfer a high-frequency electric field signal by oppositely arranging a high-frequency coupling device of the other party in communication such that the angle θ formed with the direction of the infinitesimal dipole is almost zero degrees. With the resonant unit including the series inductor 92 and the parallel inductor 93, the amount of electric current of the high-frequency signal flowing into the coupling electrode 91 can be increased, and a larger amount of charge Q can be accumulated. As a result, it is possible to increase the moment p of the infinitesimal dipole formed by the charge Q accumulated in the coupling electrode 91 and the image charge −Q at the side of the ground 94, and the high-frequency electric field signal made of the longitudinal wave $E_R$ can be efficiently radiated in the propagation direction at which the angle θ formed with the direction of the infinitesimal dipole is almost zero degrees.

Figure 12:
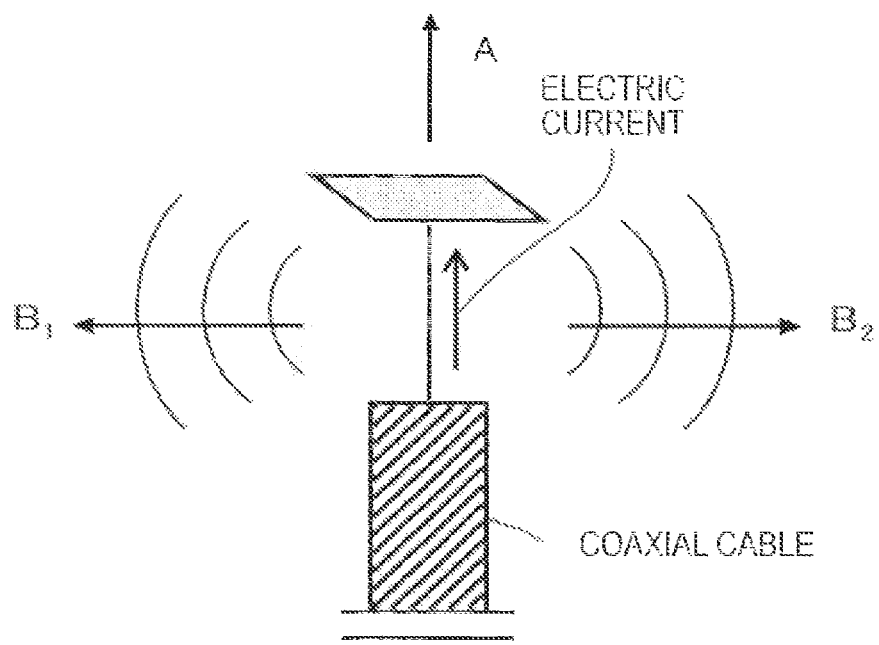
FIG. 12 is a figure illustrating an electric field generated around a capacitance loading antenna.

The high-frequency coupling device 90 as shown in FIG. 9 has a structure similar to the "capacitance loading" antenna, as shown in FIG. 12, that is made by attaching a metal piece at the end of the antenna device to make a capacitance so that the height of the antenna is reduced. The capacitance loading antenna shown in the figure radiates radio wave in circumference directions $B_1$ and $B_2$ of the radiation element of the antenna, but direction A is a null point to which the radio wave is not radiated. When the electromagnetic field generated around the antenna is considered in detail, it is understood that the following electromagnetic fields are generated: the radiation electromagnetic field attenuated in inversely proportional to the distance from the antenna, the induction electromagnetic field attenuated in inversely proportional to the square of the distance from the antenna, and the static electromagnetic field attenuated in inversely proportional to the cube of the distance from the antenna. The radio wave radiated in the circumference directions $B_1$ and $B_2$ of the radiation element of the antenna corresponds to the transverse wave $E_\theta$ mainly including the component of the radiation electromagnetic field.

In order to suppress the far field gain of the high-frequency coupling device 90 as shown in FIG. 9, the high-frequency coupling device 90 is required not to act as the capacitance loading antenna as shown in FIG. 12. Therefore, it is preferable to suppress the amount of electric current flowing in the direction perpendicular to the coupling electrode 91. For example, when the height of the coupling electrode 11 from the ground 94 is set at a level that can be disregarded with respect to the wave length of the used UWB signal, the amount of electric current in the vertical direction can be suppressed, so that the high-frequency coupling device 90 is prevented from acting as the capacitance loading antenna.

In order to improve the near field gain of the high-frequency coupling device 90 as shown in FIG. 9, the amount of electric current flowing into the metal piece (corresponding to the coupling electrode 91) at the end of the capacitance loading antenna is increased, so that the longitudinal wave $E_R$ of the radio wave mainly including the component of the induction field, which is radiated in the direction A in FIG. 12, is increased.

Subsequently, a method for structuring a memory card using the proximity wireless transfer technique will be considered.

The applicant of the present application mentions the following two conditions in order to achieve the memory card using the proximity wireless transfer technique.

(1) The transmitting power in the induction field, i.e., the near field, is improved, and even when the memory card is inserted into another information device such as a digital camera, the memory card can perform the proximity wireless transfer in a preferable manner. (2) The effect exerted on other existing communication systems due to generation of the radiation electromagnetic field, i.e., the far field, is suppressed.

When the proximity wireless transfer technique is used in the memory card, the high-frequency coupling device can be easily made by forming the ground and the coupling electrode as the wiring pattern on the same memory card substrate. FIG. 1 illustrates an example of configuration of a high-frequency coupling device 10 installed in the memory card, in which the ground 14 and the coupling electrode 11 are formed as the wiring pattern on the same memory card substrate 12.

Figure 5:
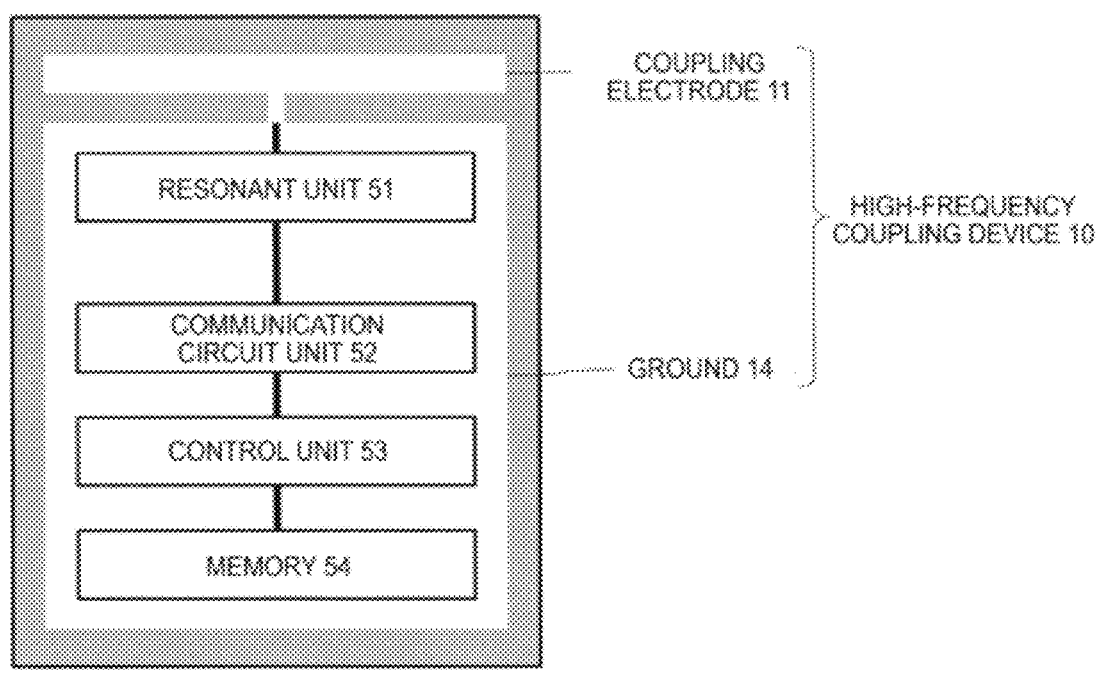
FIG. 5 is a figure illustrating an example of arrangement of a resonant unit and other circuits on a memory card substrate 12 as shown in FIG. 1.

However, in FIG. 1, the resonant unit, the communication circuit unit, and other circuits are omitted. FIG. 5 illustrates an example of arrangement of a circuit on the memory card substrate 12. The ground 14 acts not only as the planar conductor for obtaining the image charge −Q corresponding to the point charge Q accumulated in the coupling electrode 11, but also as the ground of each circuit component mounted on the memory card substrate 12. Therefore, as shown in FIG. 5, the following circuits are mounted on the ground 14: a resonant unit 51 configured to increase the amount of electric current flowing into the coupling electrode 11, a communication circuit unit 52 configured to process the high-frequency signal transmitted and received by the proximity wireless transfer, a control unit 53 configured to control overall operation of the memory card, a memory 54, and the like. The GND terminal of each circuit component is grounded to the ground 14.

The action of generating the electric field on the memory card substrate 12 as shown in FIG. 1 will be considered.

It is preferable to improve the transmitting power, i.e., the coupling action of the induction field, at an end surface portion of the memory card, which is exposed to the outside when the memory card is inserted into the slot of the information device such as the digital camera. For this reason, the conductive pattern of the coupling electrode 11 is formed, on the memory card substrate 12, at an end edge close to the insertion port of the slot (end edge at the side opposite to the connector, not shown).

When the electric current is caused to flow into the coupling electrode 11 to accumulate the charge Q, and the infinitesimal dipole as shown in FIG. 11 is formed, the ground 14 corresponds to the planar conductor in FIG. 10, and the image charge −Q (virtually representing surface charge distribution) is arranged within the ground 14. Theoretically, the planar conductor is infinitely large (as described above), but in the example of configuration as shown in FIG. 1, in reality, the conductive pattern of the ground 14 is formed to have a size as large as possible on the memory card substrate 14.

In this case, when an SD card is considered as the memory card using the proximity wireless transfer technique, the size of the memory card is 32 mm×24 mm, in which the longitudinal length of the card is longer than the lateral length of the card. Naturally, the size of the memory card substrate 12 is such that the longitudinal length thereof is longer than the lateral length thereof. Therefore, when, as shown in the example of configuration of FIG. 1, the conductive pattern of the ground 14 is formed to have a size as large as possible on the memory card substrate 12, the high-frequency coupling device 10 has such size that the longitudinal length thereof is longer than the lateral length thereof.

Figure 2:
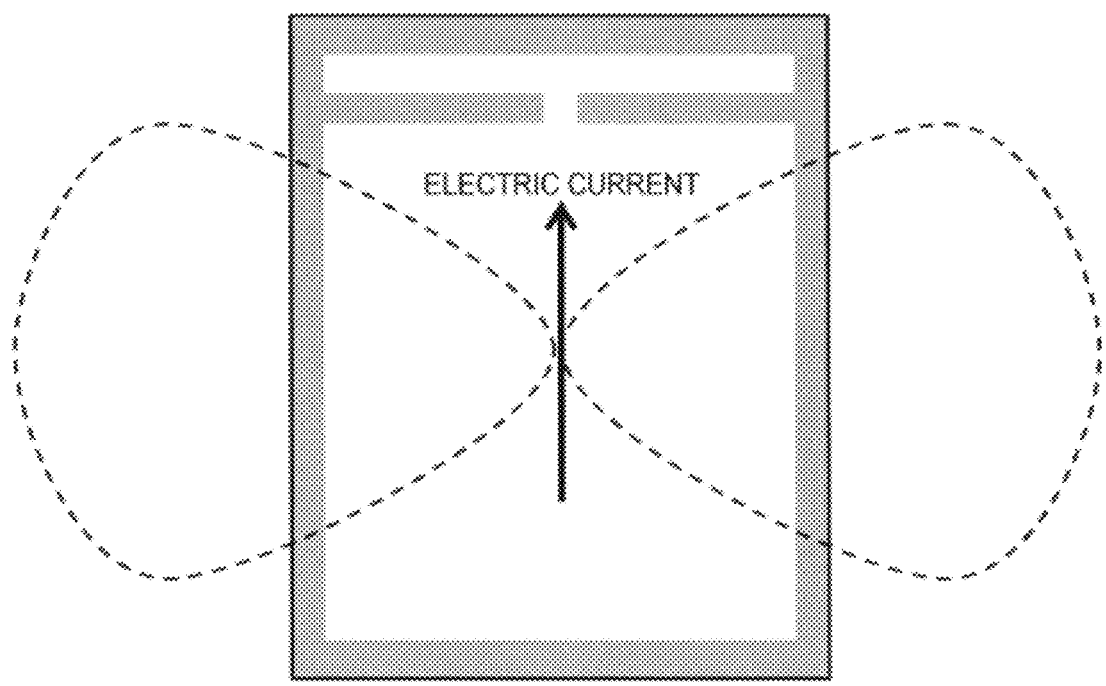
FIG. 2 is a figure illustrating how a radiation electromagnetic field is generated due to an increase in the amount of electric current flowing in the longitudinal direction within the high-frequency coupling device as shown in FIG. 1.

In this case, as shown in FIG. 2, in particular, the amount of electric current flowing in the longitudinal direction increases on the ground 14 in the high-frequency coupling device 10. Accordingly, the strength of the radiation electromagnetic field radiated in the lateral direction is increased as shown by dotted lines in the figure. As a result, the radiation electromagnetic field, which is not used in the proximity wireless transfer, is radiated, and this consumes the transmitting power. Therefore, the induction electric field strength for the near field originally required for the proximity wireless transfer is weakened. Therefore, it is difficult to achieve the above condition (1), i.e., to improve the transmitting power in the induction field, i.e., the near field".

Figure 3:
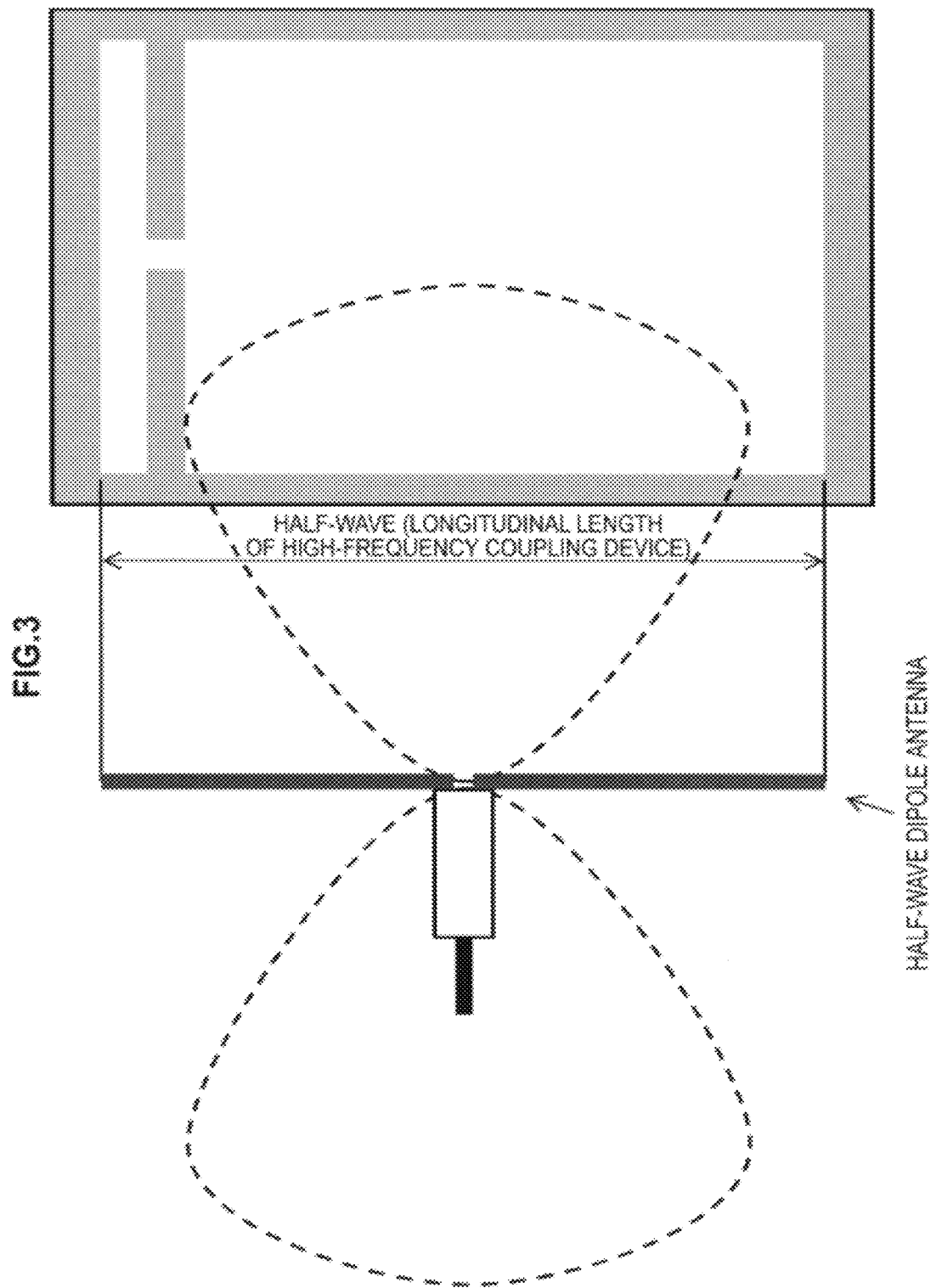
FIG. 3 is a figure illustrating an example of configuration of a half-wave dipole antenna.

In particular, in the TransferJet using a weak UWB signal, the size of the SD card is almost the length of the half-wave of the used frequency. For this reason, the coupling electrode 11 and the ground 14 formed on the memory card substrate 14 are integrated, and act as the half-wave dipole antenna as shown in FIG. 3. As a result, as described above, strong radio wave for the far field is radiated in the lateral direction.

In order to satisfy the above condition (2), i.e., to suppress "the effect exerted on other existing communication systems, it is preferable to suppress the strength of the radiation electromagnetic field. For example, when this is made into a product supporting radio communication, the strength of the radiated electric field has to be suppressed to a standard or less in order to obtain authentication under the Radio Law. The high-frequency coupling device 10 as shown in FIG. 1 has a high radiant gain for the far field as explained with reference to FIGS. 2 and 3. In order to satisfy the standard under the Radio Law, there is no choice but to decrease the transmitting power. As a result, this weakens the strength of the induction field for the near field, which is originally used for the proximity wireless transfer, which makes it difficult to perform stable communication.

Since the digital cameras are often made of metallic casing because the digital cameras has to have strength that can withstand drop even though the digital cameras are small and thin (explained above). When the memory card as shown in FIG. 1 is inserted into the digital camera, the high-frequency coupling device 10 is surrounded by metal, which blocks radiation of the electric field. Therefore, the performance as the coupling device is reduced, and this makes the communication unstable. It is also possible to design the digital camera with regard to the slot of the memory card and portions therearound in view of the performance of the high-frequency coupling device 10. However, in general, different manufacturers design and manufacture the digital camera and the memory card having the proximity wireless transfer function. Therefore, it is not practical for all the manufacturers of the digital cameras to provide products supporting the memory card having the proximity radio communication function.

Moreover, the radiation electromagnetic field radiated in the lateral direction of the memory card substrate 12 as shown in FIG. 2 is such that, when the memory card is inserted into the slot of the digital camera, the memory card is surrounded by the metal, and the radiant gain for the far field decreases. Therefore, even with the transmitting power for obtaining the strength of the induction field for the near field at which the proximity wireless transfer is originally performed, the strength of the radiated electric field satisfies the standard under the Radio Law when the memory card is inserted into the digital camera. However, in this case, not the memory card alone, but the memory card attached to the digital camera is required to obtain the authentication under the Radio Law. In other words, the authentication under the Radio Law is to be obtained for each type of digital cameras, and this burden would be the problem for vendors that manufacture and sell memory card having the proximity wireless transfer technique.

In the example of configuration of the high-frequency coupling device 10 as shown in FIG. 1, the above is summarized as follows. Since the longitudinal length of the high-frequency coupling device 10 is longer than the lateral length thereof, the amount of electric current flowing in the longitudinal direction increases in the high-frequency coupling device 10, and in particular, the amount of electric current increases on the ground 14, which increases the strength of the radiation electromagnetic field for the far field radiated in the lateral direction. Conversely, when the high-frequency coupling device 10 radiating low level of radiation electromagnetic field for the far field in the lateral direction can be made on the memory card substrate 12, the regulation of the Radio Law is not violated even if the transmitting power is increased to compensate for the low level radiation in the lateral direction. Therefore, by increasing the transmitting power to increase the strength of the induction field for the near field, sufficient communication performance for the proximity wireless transfer can be ensured.

Figure 4:
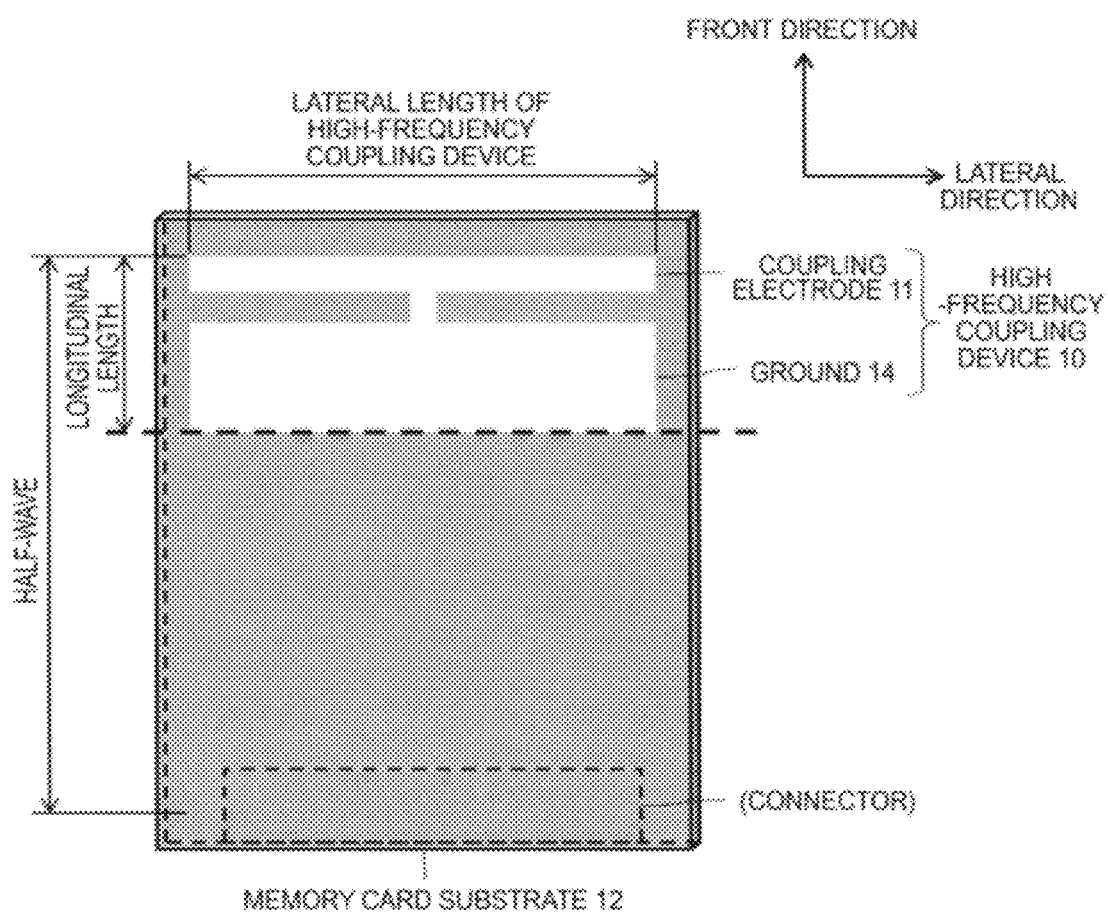
FIG. 4 is a figure illustrating another example of configuration of a high-frequency coupling device installed in a memory card, in which a ground and a coupling electrode are formed as a wiring pattern on the same memory card substrate.

Accordingly, an example of configuration where the length of the longitudinal length of the conductive pattern of the ground 14 is shortened as shown in FIG. 4 in order to reduce the amount of electric current flowing in the longitudinal direction within the high-frequency coupling device, which contributes to the radiant gain for the far field, will be considered. In this case, even when the size of the SD card serving as the memory card is almost the half-wave of the used frequency, the length of the longitudinal length of the high-frequency coupling device 10 is sufficiently shorter than the half-wave. Therefore, the coupling electrode 11 and the ground 14 do not integrally act as the half-wave dipole antenna (see FIG. 3), and it is possible to suppress the strength of the radiation electromagnetic field for the far field radiated in the lateral direction. As a result, the transmitting power is efficiently allocated to the proximity wireless transfer using the induction field for the near field, and sufficient communication performance can be ensured. In addition, the strength of the radiated electric field for the far field is expected to be suppressed to the standard prescribed under the Radio Law or less.

In the example as shown in FIG. 4, the coupling electrode 11 and the ground 14 are formed on the same surface of the memory card substrate 12. Alternatively, the coupling electrode 11 and the ground 14 may be formed in a different layer (not shown) in the same multi-layer substrate.

Figure 6B:
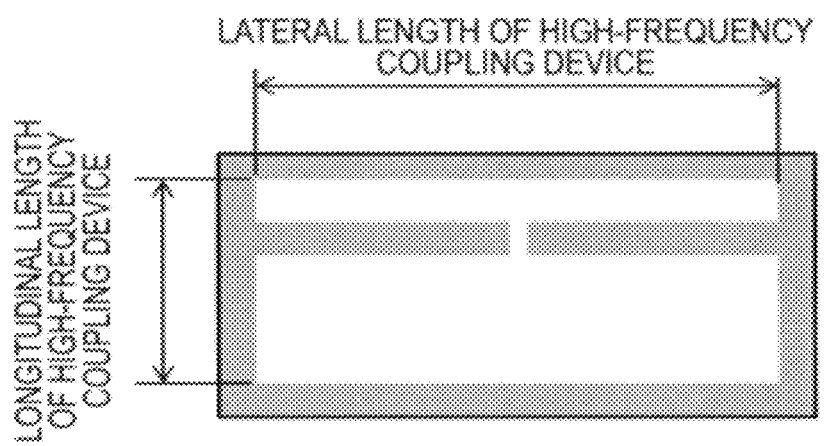
FIG. 6B is a figure illustrating the definitions of "longitudinal length" and "lateral length" of the high-frequency coupling device.

FIG. 6A respectively shows changes of a coupling strength for the near field [dB] (plotted as ■ in the figure) and a radiant gain for the far field [dBi] (plotted as ♦ in the figure) when the lateral length of the high-frequency coupling device 10 formed on the memory card substrate 12 is kept constant (20 mm) but the longitudinal length thereof is changed. It should be noted that the "longitudinal length" and the "lateral length" of the high-frequency coupling device 10 referred to herein are respectively defined as the lengths shown in FIG. 6B.

The "longitudinal length" of the high-frequency coupling device 10 corresponds to the length of the high-frequency coupling device in the direction of the moment of the infinitesimal dipole as shown in FIG. 11 or the oscillating direction of the longitudinal wave $E_R$ of which main component is the induction field. The "lateral length" of the high-frequency coupling device 10 is the length of the high-frequency coupling device in a direction perpendicular to the longitudinal length. As shown in FIGS. 1 and 4, when the high-frequency coupling device 10 is formed as the conductive pattern on the memory card substrate 12, the "lateral length" of the high-frequency coupling device 10 corresponds to the length in a direction parallel to the width direction of the memory card substrate 12.

In FIG. 6A, in the region at the left side divided by a dotted line, the longitudinal length of the high-frequency coupling device 10 is shorter than the lateral length thereof, but in the region at the right side, the longitudinal length of the high-frequency coupling device 10 is longer than the lateral length thereof. When the longitudinal length of the high-frequency coupling device 10 is shorter than the lateral length thereof, the radiant gain for the far field is suppressed to a low level, and the standard under the Radio Law can be satisfied. When the longitudinal length of the high-frequency coupling device 10 is shorter than the lateral length thereof, the coupling strength for the near field is highly stable, and therefore, the proximity wireless transfer can be performed stably.

On the other hand, when the longitudinal length of the high-frequency coupling device 10 is longer than the lateral length thereof, the radiant gain for the far field increases, and the standard under the Radio Law is exceeded, which makes it difficult to obtain the authentication. Moreover, since the transmitting power is consumed for the radiant gain for the far field, this weakens the strength of the induction field for the near field which is originally required for the proximity wireless transfer. In this case, when the transmitting power is reduced to the standard under the Radio Law or less, the induction field for the near field is further weakened, and this makes the proximity wireless transfer still more unstable communication.

As described above, when the longitudinal length of the high-frequency coupling device 10 is formed to be shorter than the lateral length thereof, the high-frequency coupling device having high near field performance can be provided on the memory card substrate 12. Therefore, even if the performance of the high-frequency coupling device for the near field is deteriorated when the memory card having the high-frequency coupling device 10 and a communication module incorporated therein is inserted into a digital camera and the like made of a metallic casing, data of images taken by the digital camera can be transferred by the proximity wireless transfer at a high speed in a stable manner.

The high-frequency coupling device 10 formed on the memory card substrate 12 is such that the longitudinal length thereof is shorter than the lateral length, and therefore, the high-frequency coupling device 10 has a lower radiant gain for the far field. Therefore, even when the transmitting power is increased, the electric field strength leaked to the distance is small, and therefore, another communication system would not be affected. By increasing the transmitting power, the strength of the induction field for the near field where the proximity wireless transfer is originally performed is increased, and therefore, even when the device is inserted into a digital camera and the like made of a metallic casing, the device can communicate stably.

The high-frequency coupling device 10 formed on the memory card substrate 12 is such that the longitudinal length thereof is shorter than the lateral length, and therefore, the radio wave is not radiated in the lateral direction. Therefore, it is possible to reduce the effect of interference caused by reflected waves from the metallic casing of the digital camera located in the lateral direction with respect to the memory card having the high-frequency coupling device 10 and the communication module incorporated therein.

By the way, the ground 14 formed on memory card substrate 12 acts not only as the planar conductor for obtaining the image charge −Q corresponding to the point charge Q accumulated in the coupling electrode 11, but also as the ground of each circuit component mounted on the memory card substrate 12. When the length of the longitudinal length of the conductive pattern of the ground 14 is shortened as shown in FIG. 4, the size of area as the ground for the other circuit components is reduced.

Figure 7:
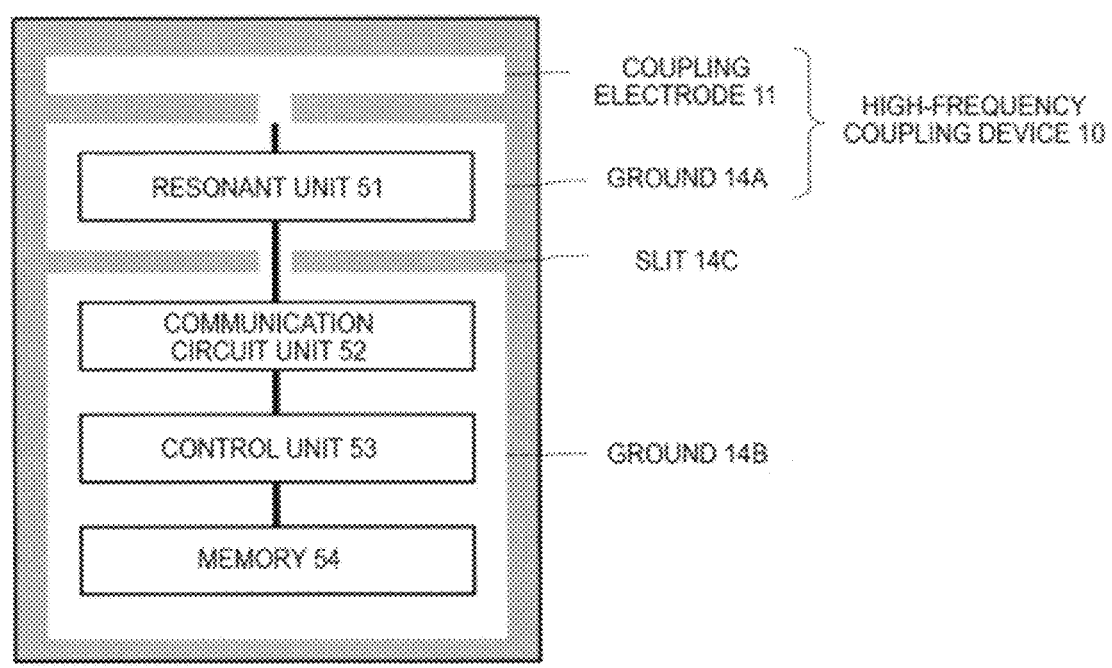
FIG. 7 is a figure illustrating an example of arrangement of a resonant unit and other circuits on the memory card substrate 12 as shown in FIG. 5.

Accordingly, instead of forming the conductive pattern integrating the ground for the high-frequency coupling device and the ground for the other circuit components, a slit 14C may be placed in the conductive pattern of the ground 14 as shown in FIG. 7, so that the conductive pattern is separated into a first ground portion 14A for the high-frequency coupling device and a second ground portion 14B for the other circuit components. The longitudinal length of the first ground portion 14A for the high-frequency coupling device is formed to be shorter than the lateral length, the radiant gain for the far field is suppressed to a low level to satisfy the standard of the Radio Law, and the coupling strength for the near field can be kept at a high level to stably perform the proximity wireless transfer. The resonant unit 51 is mounted on the first ground portion 14A. The circuits such as the communication circuit unit 52, the control unit 53, and the memory 54 are mounted on the second ground portion 14B, and the GND terminal of each of the circuit components 52 to 54 is grounded to the second ground portion 14B.

In the example as shown in FIG. 7, the first ground portion 14A and the second ground portion 14B are formed on the same surface of the memory card substrate 12. Alternatively, the first ground portion 14A and the second ground portion 14B may be formed in a different layer (not shown) in the same multi-layer substrate.

It is to be understood that, when no other circuit component is arranged on the memory card substrate 12, it is not necessary to provide a lit in the ground 14 to form the second ground portion 14B separated from the first ground portion 14A, and it is sufficient to simply shorten the longitudinal length of the ground 14.

It should be noted that the technique disclosed in this specification can be made as the following configuration.

(1) A communication apparatus including: a substrate; a high-frequency coupling device including a coupling electrode and a ground formed as a conductive pattern on the substrate; a communication circuit unit configured to process a high-frequency signal transmitted and received by the coupling electrode; and a resonant unit configured to increase an amount of electric current flowing into the coupling electrode, wherein the high-frequency coupling device is configured such that a longitudinal length is shorter than a lateral length.

(2) The communication apparatus according to (1), wherein an infinitesimal dipole made of a line segment connecting between a center of a charge accumulated in the coupling electrode and a center of an image charge accumulated in the ground is formed, and the high-frequency signal is transferred to a party in communication oppositely arranged such that an angle θ formed with a direction of the infinitesimal dipole is almost zero degrees.

(3) The communication apparatus according to (1), wherein the longitudinal length of the high-frequency coupling device is sufficiently shorter than a half-wave of the high-frequency signal.

(4) The communication apparatus according to (1), wherein the coupling electrode and the ground are formed on a same surface of the substrate.

(5) The communication apparatus according to (1), wherein the substrate has a multi-layer structure, and the coupling electrode and the ground are formed in different layers on the substrate.

(6) The communication apparatus according to (1), further including: a second ground on the substrate, wherein the second ground is separated from the ground of the high-frequency coupling device.

(7) The communication apparatus according to (6), wherein the ground of the high-frequency coupling device and the second ground are formed on a same surface of the substrate and are separated by a slit.

(8) The communication apparatus according to (6), wherein the second ground is used to ground a circuit component, other than the resonant unit, mounted on the substrate.

(9) The communication apparatus according to any of (1) to (8), wherein the communication apparatus is incorporated into a memory card, and the substrate is a memory card substrate on which a memory and a circuit component for the memory card are mounted.

(10) The communication apparatus according to any of (1) to (8), wherein the communication apparatus is incorporated into an information device, and the substrate is a main circuit substrate on which a main circuit component of the information device is mounted.

It should be understood by those skilled in the art that various modifications, combinations, sub-combinations and alterations may occur depending on design requirements and other factors insofar as they are within the scope of the appended claims or the equivalents thereof.

In this specification, the embodiment has been mainly described in which the high-frequency coupling device is made with the conductive pattern of the coupling electrode and the ground formed on the memory card substrate. However, the gist of the technique disclosed in this specification is not limited thereto. Alternatively, a communication apparatus for communicating by proximity wireless transfer can be achieved with a high-frequency coupling device made by forming a conductive pattern of a coupling electrode and a ground on any circuit substrate other than the memory card.

Figure 8:
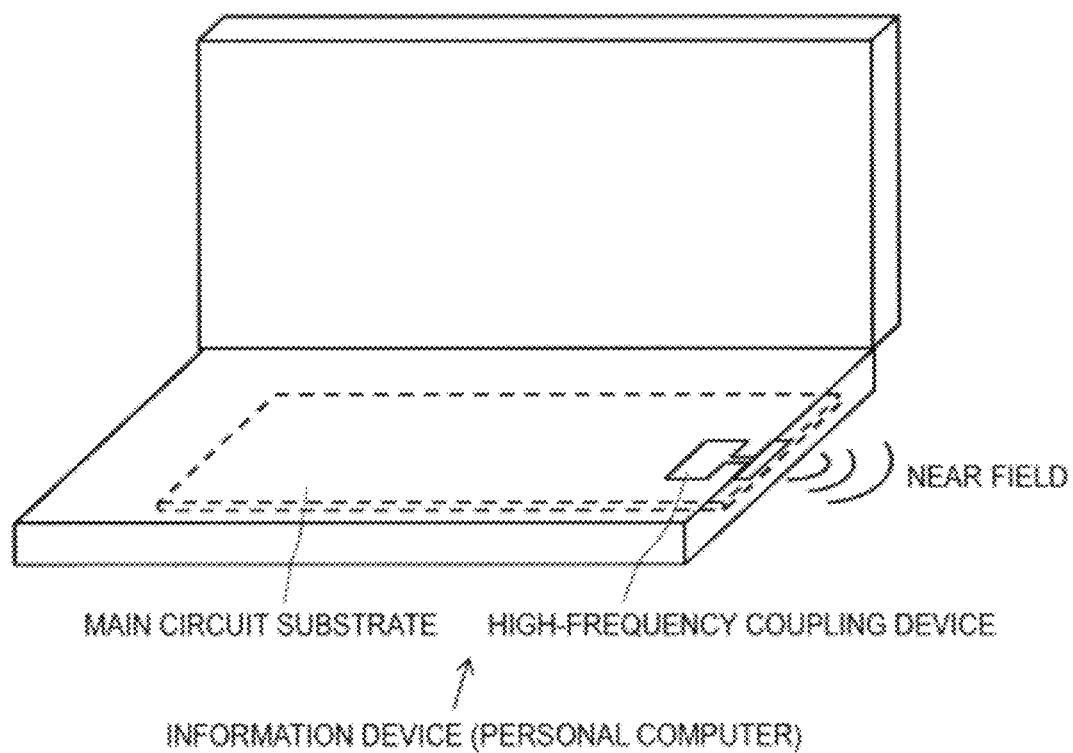
FIG. 8 is a figure illustrating an example of a personal computer having a high-frequency coupling device made by forming a conductive pattern of the coupling electrode and the ground on the main substrate.

For example, as shown in FIG. 8, a conductive pattern of a coupling electrode and a ground in which the longitudinal length is shorter than the lateral length may be formed on a main circuit substrate (mother board), and a communication apparatus having a high-frequency coupling device capable of reducing the radiant gain for the far field to a low level and stably performing the proximity wireless transfer can be provided in a personal computer.

In short, this technique has been disclosed as a form of example, and the content of the description of this specification should not be interpreted in a limiting manner. In order to determine the gist of this technique, claims should be taken into consideration.

The present disclosure contains subject matter related to that disclosed in Japanese Priority Patent Application JP 2011-136773 filed in the Japan Patent Office on Jun. 20, 2011, the entire content of which is hereby incorporated by reference.

What is claimed is:

1. A communication apparatus comprising:
a substrate;
a coupling device including a coupling electrode and a first ground portion formed as a conductive pattern on the substrate along a longitudinal length of the coupling device;
a communication circuit unit configured to process a signal transmitted and received by the coupling electrode;
a resonant unit configured to increase an amount of electric current flowing into the coupling electrode, wherein the longitudinal length of the coupling device is shorter than a lateral length of the coupling device perpendicular to the longitudinal length; and
a second ground portion formed on the substrate,
wherein the coupling electrode, the first ground portion and the second ground portion are formed on the same surface of the substrate, and wherein the resonant unit is mounted on the first ground portion and the communication circuit unit is mounted on the second ground portion.

2. The communication apparatus according to claim 1, wherein an infinitesimal dipole made of a line segment connecting a center of a charge accumulated in the coupling electrode and a center of an image charge accumulated in the first ground portion is formed, and the signal is transferred to another communication apparatus arranged opposite to the communication apparatus such that an angle θ formed with a direction of the infinitesimal dipole is almost zero degrees.

3. The communication apparatus according to claim 1, wherein the longitudinal length of the coupling device is sufficiently shorter than a half-wave of the signal.

4. The communication apparatus according to claim 1, wherein the substrate has a multi-layer structure, and the coupling electrode and the first ground portion are formed in different layers on the substrate.

5. The communication apparatus according to claim 1, wherein the second ground portion is separated from the ground of the coupling device.

6. The communication apparatus according to claim 1, wherein the first ground portion and the second ground portion are separated by a slit.

7. The communication apparatus according to claim 1, wherein the second ground portion is used to ground a circuit component, other than the resonant unit, mounted on the substrate.

8. The communication apparatus according to claim 1, wherein the communication apparatus is incorporated into a memory card, and the substrate is a memory card substrate on which a memory and a circuit component for the memory card are mounted.

9. The communication apparatus according to claim 1, wherein the communication apparatus is incorporated into an information device, and the substrate is a main circuit substrate on which a main circuit component of the information device is mounted.

10. The communication apparatus according to claim 1, wherein the longitudinal length of the coupling device is along a direction of a moment of a dipole formed between a charge accumulated in the coupling electrode and a charge accumulated in the first ground portion.

\* \* \* \* \*